United States Patent [19]
Rhodes

[11] 4,190,410
[45] Feb. 26, 1980

[54] COOKIE FORMING APPARATUS

[76] Inventor: Herbert C. Rhodes, 6811 SE. Ash Pl., Portland, Oreg. 97215

[21] Appl. No.: 962,248

[22] Filed: Nov. 20, 1978

[51] Int. Cl.$^2$ .............................................. A21C 3/10
[52] U.S. Cl. ................................... 425/239; 222/251; 222/282; 425/311
[58] Field of Search ................ 425/239, 311; 222/251, 222/282

[56] References Cited

U.S. PATENT DOCUMENTS

| | | | |
|---|---|---|---|
| 2,250,128 | 7/1941 | Jeschke | 425/311 |
| 2,582,542 | 1/1952 | Hein | 425/311 |
| 2,838,013 | 6/1958 | Weidenmiller et al. | 425/311 |
| 3,064,589 | 11/1962 | Genish | 425/311 |
| 3,249,068 | 5/1966 | Gembicki | 425/239 |

Primary Examiner—William E. Schulz
Attorney, Agent, or Firm—Klarquist, Sparkman, Campbell, Leigh, Hall & Whinston

[57] ABSTRACT

Cookie dough in a dough hopper is extruded through a die by means of a pair of dough rolls, and the extruded dough is separated into a plurality of cookie-shaped deposits employing a cutoff wire reciprocated beneath the die. After each movement of the cutoff wire, a conveyor carrying a tray moves a short distance for spacing the dough deposits on the tray. The dough rolls are operated independently from the cutoff wire and conveyor so that a variable quantity of dough can be extruded for each deposit, and a time delay is provided for operation of the cutoff wire such that a sufficient quantity of dough is extruded before initial severing of the dough.

7 Claims, 4 Drawing Figures

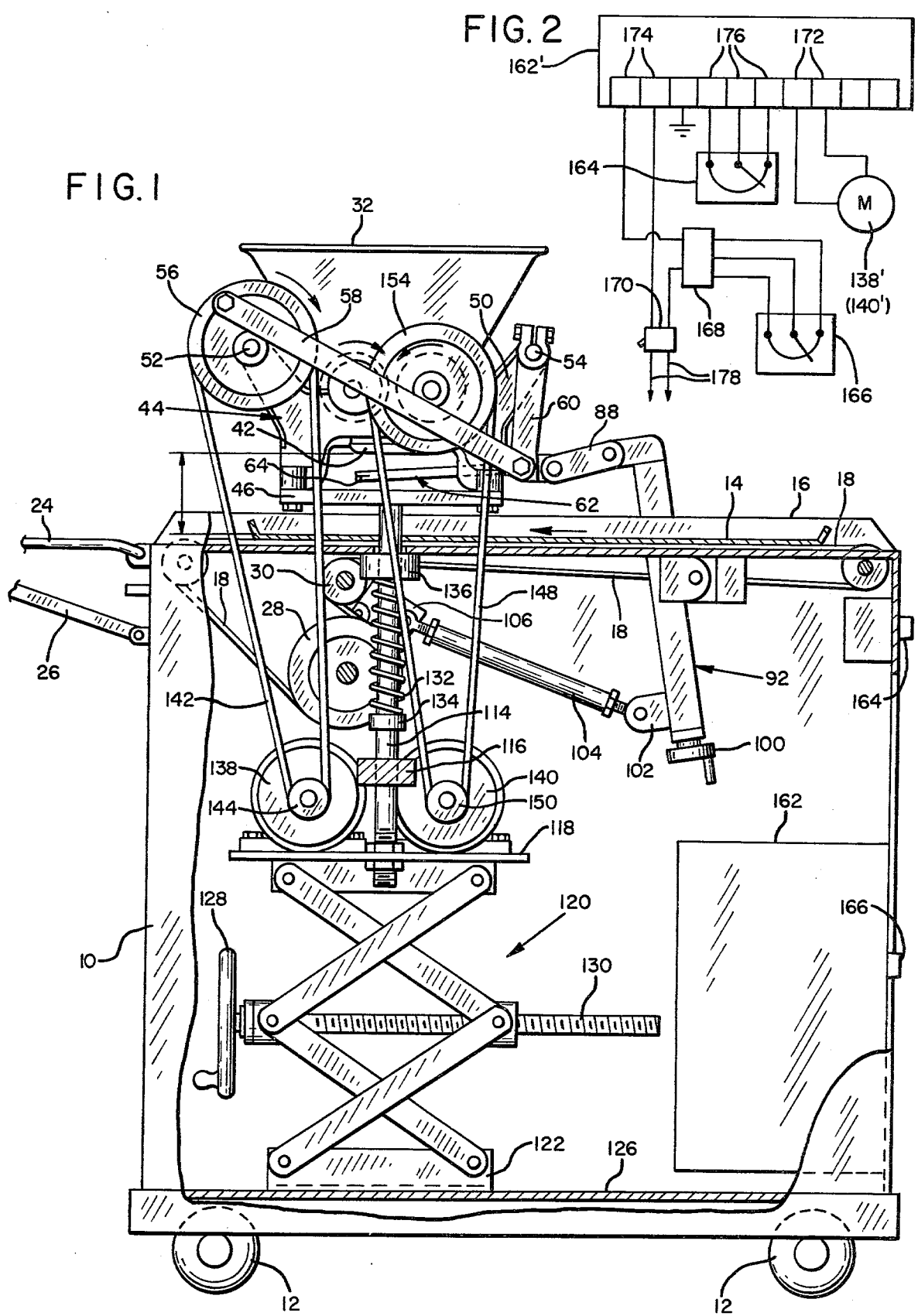

COOKIE FORMING APPARATUS

BACKGROUND OF THE INVENTION

The present invention relates to a cookie forming apparatus and particularly to such an apparatus for producing an adjustable, but more uniform, cookie output.

Cookie forming apparatus heretofore employed has included a dough hopper and dough rolls for extruding dough through a die after which the dough is severed into cookie-shaped deposits by a cutoff wire. A conveyor receives the deposits and changes position between cutoff operations for proper cookie spacing. Prior cookie forming apparatus is mechanically designed for substantially intermittent operation such that a predetermined quantity of dough is extruded prior to each cutting operation whereby the thickness of each deposit is substantially constant but not conveniently adjustable. Moreover, when such an apparatus is started in operation, the mechanical movement initiates dough severing operations before sufficient dough has been delivered through the die to form a suitable cookie. Therefore, each startup operation results in waste because of a number of improperly formed cookies which have to be sorted out and discarded.

SUMMARY OF THE INVENTION

In accordance with the present invention, a cookie forming apparatus includes a dough receiving hopper provided with a die through which cookie dough is extruded by dough rolls, and a cutoff wire supported on a bail which severs the dough for receipt as cookie-shaped deposits on a conveyor. First drive motor means has a driving connection with the conveyor and the bail, in predetermined relation for causing proper cutoff operation and conveyor movement to receive cookie-shaped deposits at spaced locations. A second substantially independent drive motor means operates the dough rolls, and the second drive motor means is separately adjustable for determining the speed of rotation of the dough rolls and consequently the quantity of dough extruded through the die between severing operations whereby the quantity or thickness of each deposit can be adjusted. Preferably a time delay means determines the operation of the first drive motor means whereby sufficient dough is extruded through the die before the cutoff and conveying operations commence, thereby avoiding an improper first extrusion cutting upon machine startup. In accordance with the preferred embodiment, both drive motor means as well as the hopper and cutoff apparatus are mounted on a scissors jack so that proper elevation of the hopper can be attained with respect to the conveyor for avoiding improper dropping of cookie dough.

It is accordingly an object of the present invention to provide an improved cookie forming apparatus wherein the quantity of dough in respective cookie-shaped deposits can be readily adjusted.

It is a further object of the present invention to provide an improved cookie forming apparatus wherein initially improper deposits of dough upon machine startup are avoided.

It is another object of the present invention to provide an improved cookie forming apparatus which is readily adjustable in elevation with respect to the dough receiving conveyor means so that cookie deposits are not improperly dropped onto the dough receiving conveyor means.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a first side view, partially broken away, of a cookie forming apparatus according to the present invention;

FIG. 2 is a wiring diagram for motor control operating a first drive motor means in the cookie forming apparatus according to the present invention;

DETAILED DESCRIPTION

Figure 3:
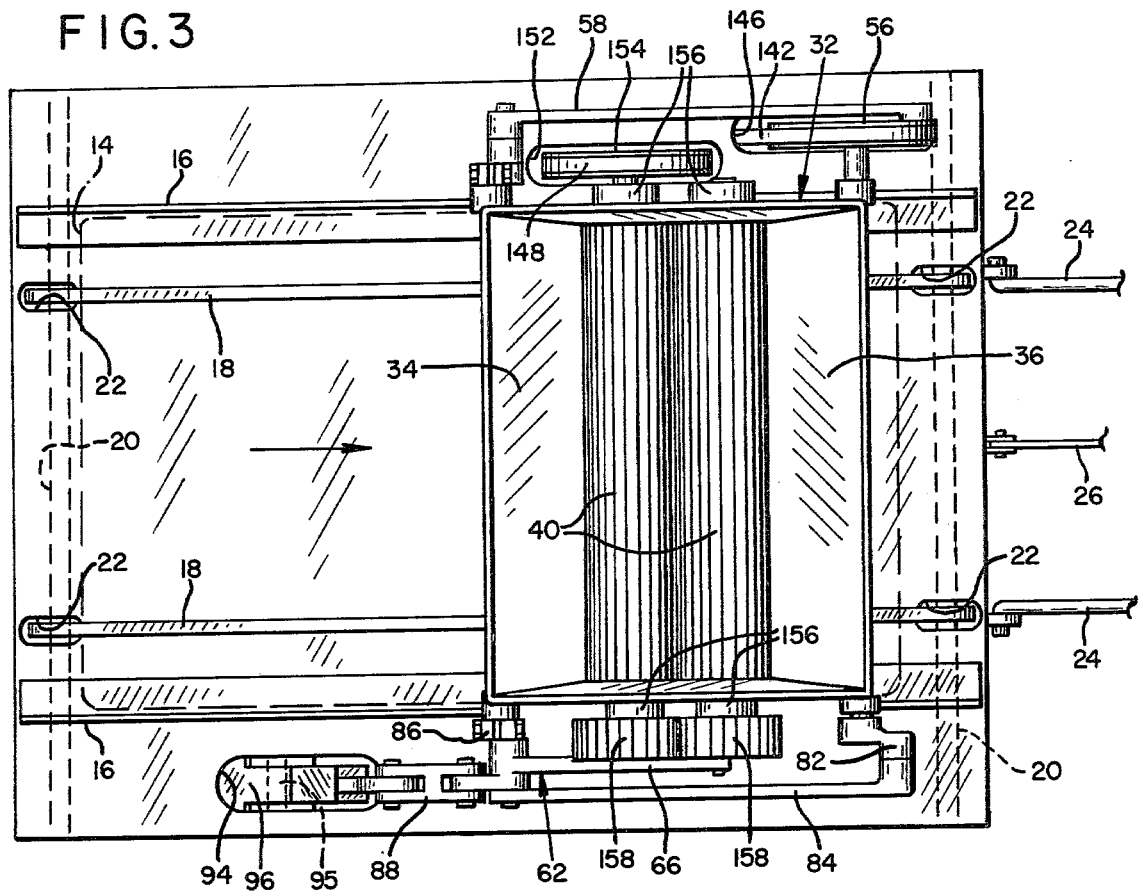
FIG. 3 is a plan view of the cookie forming apparatus according to the present invention.

Referring to the drawings, a cookie forming apparatus according to a preferred embodiment of the present invention comprises a cabinet 10 mounted upon casters 12 and supporting a cookie receiving tray or pan 14 on the top thereof between metal angle pan guides 16. The pan moves in the direction indicated by the arrows upon a conveyor formed by belts 18 spaced between the pan guides and extending between belt engaging rollers mounted for rotation on end shafts 20 located adjacent opposite top ends of the cabinet and just below the top surface thereof. The return runs of the belts pass through apertures 22 in the cabinet top. The pan is received at the right end of the cabinet, as viewed in FIG. 1, and may be subsequently received upon pan extension carrier 24, at the left end of the cabinet as viewed in FIG. 1, said carrier being supported by lock brace 26 disposed therebeneath on the cabinet end wall. The belts 18 pass around drive pulleys 28, and reversely around tightener pulleys 30 mounted under the cabinet top.

A dough hopper 32 is located above the top surface of the cabinet in spaced relation above the location of pan 14. The hopper extends crossways of the cabinet for substantially the full width of the pan 14 between the pan guides, and has inwardly sloping forward and rearward walls 34 and 36 for guiding dough 38 toward a pair of parallel, opposed dough rolls 40. The dough rolls have a knurled surface and are spaced a short distance apart for forcing the dough in the hopper downwardly when the rolls are turned toward each other in opposite directions as indicated in FIG. 1. At the bottom of the hopper and beneath dough rolls 40, a cookie die 42 is removably secured, by means not shown, in closing relation to an elongate aperture in the bottom of the hopper. This die includes a number of cookie-shaped apertures having an appropriate design for the finished cookies. As the dough rolls turn, cookie dough is extruded through the die and toward the pan therebeneath.

The hopper 32 is supported upon a cast metal hopper base 44 having four legs, wherein pairs of said legs at either side of the cookie pan are mounted upon riser blocks 46 completing a headblock configuration. The legs are suitably secured to the riser blocks employing screws 48 extending upwardly therethrough. Four angularly upwardly extending arms 50 at the corner of the base 44 carry bearings rotatably receiving a rearward drive shaft 52 and a forward drive shaft 54 extending crossways of the machine between aligned hopper base arms. Drive shaft 52 is rotated in a clockwise direction as viewed in FIG. 1 by pulley 56 in a manner hereinafter described. A connecting arm 58 is pivotally secured to pulley 56 near the periphery thereof for converting rotational motion into translational motion, wherein the opposite end of connecting arm 58 pivotally engages the lower end of swinging arm 60, the top end of which is secured to shaft 54.

Also pivotally suspended from the lower end of arm 54 is a bail 62 carrying a cutoff wire. The bail 62 comprises a plurality of arms extending in a direction longitudinal of the cookie pan and underneath the hopper 32 between the apertures of die 42 and these arms carry a cutoff wire between slots 64 thereof. As pulley 56 rotates, bail 62 moves back and forth, with the cutoff wire severing the dough when the bail 62 moves from right to left as viewed in FIG. 1. The bail further includes a guide arm 66 having a nylon roller 68 adapted to ride in a wire-lift assembly 70 provided with a horizontal lower surface 72 towards its rearward end and an upwardly cammed surface toward its forward end, as indicated at 74. When nylon roller 68 moves from right to left in FIG. 4, arm 66 and bail 62 are rotated in a counterclockwise direction. Assembly 70 further includes a top gate 76 which is pivoted at 78 and provided with an aperture 80. As the arm 66 moves to the left along the cammed surface as indicated at 74, gate 76 is raised allowing the nylon roller to escape. Then, as the nylon roller executes movement to the right, it will pass over the top of gate 76 until aperture 80 is reached, at which time the roller will drop back to surface 72. Thus, the bail will be upraised for its left to right movement; in FIG. 4, passing the cutoff wire immediately below the die 42 for severing the dough being extruded therethrough. Then, after the dough is extruded, the cutoff wire drops away for the reverse pass, right to left in FIG. 4.

The support mechanism for bail 62 is substantially repeated on the opposite side of the hopper. Thus, a crank arm 82 is mounted upon drive shaft 52 and is pivotally connected to arm 84 extending to the lower end of swinging arm 86 joined at its upper end to shaft 54. A pivotal connection at the lower end of arm 86 joins arm 84 and bail 62.

The rearward end of bail 62 engages link 88 which is pivotally connected to the bail on one end and to link bracket 90 of index lever 92 at its remote end. Index lever 92 extends downwardly through aperture 94 in the cabinet top where it is rotatable about fulcrum bearing 95 supported on fulcrum boss 96 secured to the cabinet. Lever 92 is hollow and receives therewithin an index screw 98 rotatable by means of handwheel 100. A bracket 102 extends through a slot in the index lever and carries an index nut threadably engaging the index screw whereby rotation of the handwheel moves bracket 102 along the lever. Bracket 102 has a pivotal connection to adjustable connecting rod 104 which is also pivotally joined at its remote end to index arm 106. Index arm 106 is rotatable about index drive shaft 108. A ratchet 110 is mounted upon drive shaft 108 and is engaged by a pawl 112 carried on the index arm 106.

Figure 4:
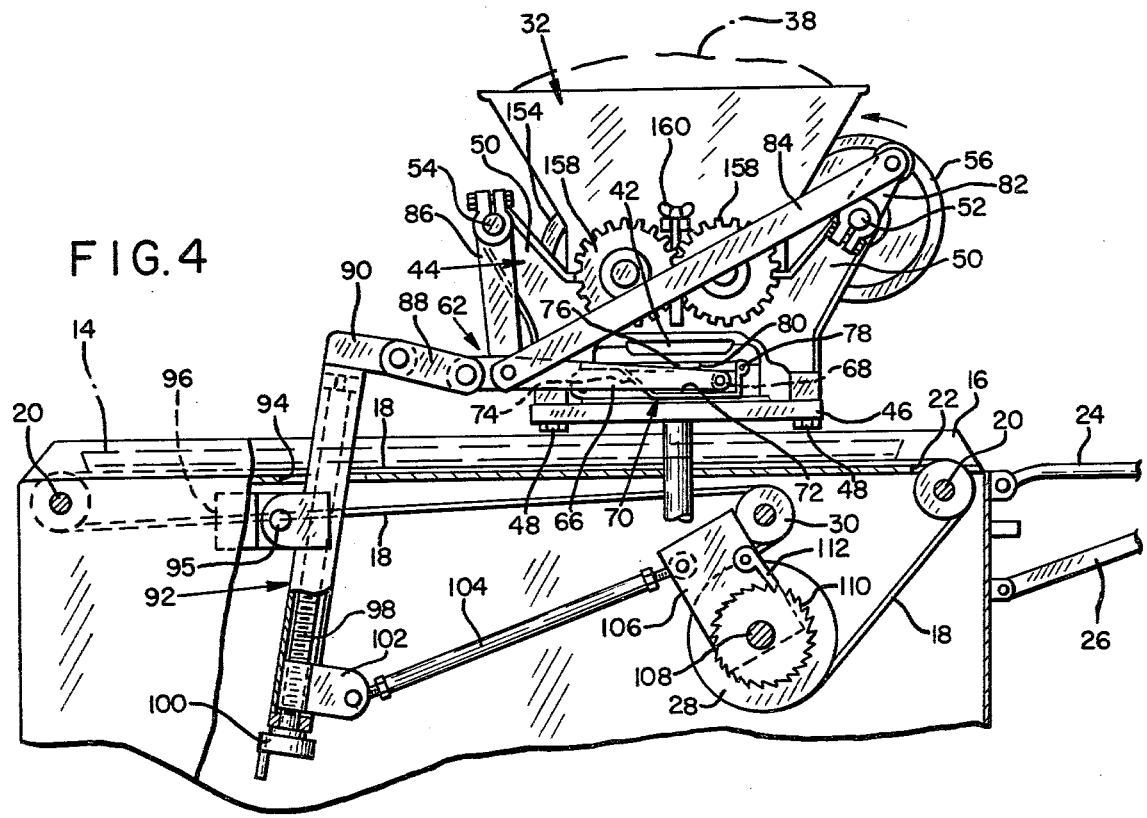
FIG. 4 is a second side view, partially broken away, of the apparatus according to the present invention, taken from the opposite side of the apparatus from the view of FIG. 1.

As pulley 56 rotates, driving bail 62 back and forth under the hopper, it will be seen lever 92 simultaneously swings back and forth moving index arm 106. Considering the apparatus as illustrated in FIG. 4, when the bail 62 moves from left to right, dough is severed from die 42 and the same is deposited in pan 14 carried by belts 18. At this time, index drive shaft 108 remains stationary, with pawl 112 passing over the teeth of ratchet 110. However, as pulley 56 continues to rotate and bail 62 moves from right to left, index arm 106 will be rotated in a clockwise direction and pawl 112 will engage ratchet 110 in driving relation. Consequently, index shaft 108 will turn and pulleys 28 mounted thereon will also turn in a clockwise direction (as viewed in FIG. 4) for moving upper belts 18 in the indicated direction, left to right in FIG. 4. It is noted the movement of belts 18 and the cookie pan is intermittent and occurs between passes of the cutoff wire for severing dough. Handwheel 100 is adjusted so a desired spacing will be left between dough deposits as a consequence of adjusting the throw of a pawl and ratchet arrangement controlling the movement of the belts.

Riser blocks 46 are carried respectively by and secured to riser rods 114 which extend downwardly through apertures in the top of the cabinet and through guide apertures in bearing blocks 116 and 136 secured to the cabinet. The lower extremities of the riser rods are threaded and are secured to motor mounting plate 118 supported on a scissors jack generally indicated at 120. The base 122 of the scissors jack mounts to the cabinet base or floor 126. A handwheel 128 rotates screw 130 for raising and lowering motor mounting plate 118 as desired and it is seen the riser blocks 46 attached to the hopper base are raised and lowered concurrently with the motor base 118. A compression spring 132 is positioned between a block 134, secured to each riser rod, and apertured block 136 secured to the underside of the cabinet top for insuring a stable position for the riser blocks, which comprise the headblock, and the hopper structure mounted thereupon.

Motor mounting plate 118 carries motors 138 and 140, and a drive belt 142 extends from drive pulley 144 mounted on the shaft of motor 138 to the aforementioned pulley 56 through an opening 146 in the cabinet top. A second belt 148 passes around drive pulley 150 of motor 140, and through aperture 152 in the cabinet top for engaging drive pulley 154 secured to the shaft of one of the dough rollers 40.

Thus, the operation of the scissors jack through rotation of handwheel 128 raises and lowers not only the headblock supporting the hopper and bail, but also the motor drive therefor such that no adjustment need be made in the drive belts or the like. However, the drive motors are located inside the cabinet and away from the edible material. Although the conveyor belts 18 remain at the top cabinet lever, and are operated via lever 92 which is fixed in vertical position, the lever is operated by way of flexible link 88 pivotally connected to the bail, thus insuring freedom of vertical movement of the headblock. The vertical adjustment by means of the scissors jack 120 is desired so that the dropping distance of cookie dough can be adjusted. It will be appreciated that for different cookie shapes and sizes determined by die 42, and for different quantities of dough determined by varying the speed of the dough rolls, a different dropping distance may be required to avoid turning the dough over as it drops if this is not desired, or otherwise improperly depositing the same on the cookie pan 14.

The vertical adjustment is made so that the correct deposit is procured in a given instance.

The central shafts of both dough rollers 40 extend the full length of the hopper 32, crossways of the cookie pan, being supported by bearing means 156 partially external to the hopper. At the end of the hopper opposite pulley 154, the central shafts of the respective rolls 40 are provided with meshing spur gears 158 whereby rotation of pulley 154 causes counter-rotation of the dough rolls, i.e., in a downward direction between the rolls. The hopper 32 is secured to hopper base 44 by means of catches or hasps comprising pivotable studs extending upwardly from each end of the base 44 to receive wing nuts 160 bearing upon a slotted block mounted at an end of the hopper. The hopper carries with it the upper halves of bearings 156, while base 44 carries the lower part of the bearings so that with removal of the hopper, the rolls 44 can also be removed for cleaning purposes.

Both motors 138 and 140 are direct current motors adapted for precise speed control so that the various operations of the cookie forming apparatus can be adjusted as to speed and coordinated. A motor control unit 162 is incorporated in cabinet 10 and includes a separate controlled rectifier power supply for each of the motors so the speed of the motors can be separately adjusted. The system for empowering motor 138 will be more particularly described in connection with FIG. 2 wherein reference numeral 162' particularly refers to the control unit, which may be of a conventional type, for energizing motor armature 138' via terminals 172. Alternating current power is connected to the control 162' via terminals 174, in the manner hereinafter more fully described, and terminals 176 connect to a conventional potentiometer 164 employed for adjusting the speed of the motor 140. As illustrated in FIG. 1, the potentiometer 164 is conveniently positioned at the top end of the cabinet for ease of operator adjustment.

Power terminals 174 are connected to AC line 178 via a double pole switch 170, one output lead of which is connected to a control input terminal 174, and the other output lead of which is coupled to the remaining terminal 174 by way of a timer circuit 168 which may comprise a solid state timing unit No. 852S-A manufactured by the Allen-Bradley Co., Milwaukee, Wisconsin. A potentiometer 166 is employed in conjunction with the timer circuit 168 for adjusting the timing period thereof, with this potentiometer also being mounted on the end of cabinet 10 as illustrated in FIG. 1. The adjustment of potentiometer 166 determines the time at which power is supplied to terminals 174 of control 162' after switch 170 is operated for energizing motor 138.

The control for motor 140 is identical to that shown in FIG. 2, except for the absence of the timer circuit 168 and potentiometer 166. Thus, the switch 170 is connected directly to power terminals 174. The same switch 170 may be utilized for both the control for motor 138 and the control for motor 140 such that operation of the switch 170 immediately energizes motor 140 whereby the dough rolls start the extruding process through die 142. Then, after timer circuit 168 times out, motor 138 is started for operating bail 62 as well as the conveyor belts 18. Usually, the timer circuit 168 is set by potentiometer 166 to bring about a delay of one to four seconds in the starting operation of motor 138 such that sufficient dough will be extruded through the die 42 before the cutoff wire severs the same.

It is important to note that a speed control potentiometer 164 in connection with the control for motor 140 is employed for adjusting the speed of the dough rolls, and thus the speed of dough extrusion, independently of the operation and speed of operation of the bail and conveyor. Thus the thickness of dough deposit is adjustable. The operation of the bail can also be interrupted entirely for delivering a continuous dough extrusion if desired. The potentiometer 164 for speed control of motor 140 is located at the position indicated by reference numeral 164 in FIG. 1. That is, the two speed control potentiometers 164 are adjacent one another and are conveniently available for adjusting relative speed.

In reviewing the operation of the present invention, dough received in dough hopper 32 is extruded through die 42 by means of dough rolls 40 driven by motor 140. Upon startup of the machine, motor 140 is substantially immediately started and begins extruding dough through the die. A predetermined time later, according to the setting of potentiometer 166 associated with motor 138, motor 138 starts, which brings about reciprocating operation or bail 62 carrying a cutoff wire which severs the extruded dough after sufficient dough has passed through the die to form a proper deposit on the cookie pan 14 therebelow. On each forward stroke of the bail 62 (right to left in FIG. 1) dough is severed and dropped onto the cookie pan. As the bail reciprocates in the opposite direction, the conveyor belts 18 are moved forwardly (to the left in FIG. 1) through the operation of lever 92 and pawl and ratchet 112, 110. Handwheel 100 may be adjusted for changing the spacing between cookie deposits on the pan 14. In order to change the thickness of the cookie deposit and resulting cookie, the speed control 164 associated with motor 140 is adjusted, or alternatively, the speed control for motor 138 is adjusted with respect to the speed of motor 140.

If the cookies do not drop properly and evenly upon cookie pan 14, handle 128 can be rotated for adjusting the spacing of the headblock carrying the dough hopper for achieving a proper spacing and a proper drop. It will be understood that both handles 128 and 100 are accessible through cabinet doors, not shown on these drawings.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Cookie forming apparatus comprising:

a hopper for receiving cookie dough, said hopper being provided with a die at the bottom thereof having a plurality of apertures through which cookie dough passes for taking on an exterior shape corresponding to the exterior shape of said apertures, and including a pair of adjacently opposed dough rolls positioned in said hopper above said die and rotated in opposite directions for forcing dough toward said apertures and extruding dough through said apertures, a conveyor located underneath said die for receiving extruded dough therefrom, a cutoff wire and a bail supporting said cutoff wire in alignment between said die and said conveyor in position for severing dough extruded through said die by said rolls, first drive motor means having a driving connection with said conveyor and said bail for operating said conveyor and bail in predetermined relation causing said bail to pass said cutoff wire successively through extruded dough to provide cookie-shaped dough deposits on said conveyor and for moving said conveyor to receive cookie-shaped deposits at spaced locations as provided by successive operation of said bail, said second drive motor means independent of said first drive motor and having a driving connection to said dough rolls for turning said dough rolls independently from said first drive motor means, said last mentioned drive motor means being separately adjustable for determining the speed of rotation of said dough rolls and correspondingly the quantity of dough extruded through said apertures for each deposit severed by said cutoff wire.

2. The apparatus according to claim 1 further comprising a motor control for operating said first drive motor means, including a time delay circuit for delaying operation of said first drive motor means until a predetermined time after energization of said second drive motor means so that a predetermined quantity of dough is extruded through said apertures by said dough rolls before operation of said first drive motor means causes severing of said dough by said cutoff wire.

3. The apparatus according to claim 1 including a common headblock for mounting said hopper, said die, said dough rolls, and said bail supporting said cutoff wire, riser rod means supporting said common headblock in vertical relation adjacent said conveyor, and a scissors jack positioned beneath said conveyor and attached in supporting relation to said riser rod means, said scissors jack being adjustable in a vertical direction for moving said common headblock in relation to said conveyor to provide a variable spacing between said headblock and said conveyor.

4. The apparatus according to claim 3 further including a motor base underneath said conveyor and also supported by said scissors jack, said motor base supporting said first drive motor means and said second drive motor means, said driving connections extending from said drive motor means and adjacent said riser rod means to said headblock for operating said bail and said dough rolls respectively.

5. The apparatus according to claim 4 wherein said driving connection of said first drive motor means includes a lever, and pawl and ratchet means operated by said lever for imparting motion to said conveyor from said first drive motor means when said bail supported cutoff wire has severed dough extruded through said die, and including a flexible link between said bail and said lever to accommodate operation of said lever for various vertical positions of said headblock in accordance with the adjustment of said scissors jack.

6. The apparatus according to claim 5 wherein said first drive motor means includes a first drive motor supported by said motor base, and said driving connection of said first drive motor means also includes a pulley mounted on said headblock, a belt between said first drive motor and said pulley, and first linkage means between said pulley and said bail for changing rotational movement of said pulley into translational movement of said bail, said lever being mounted independently from said headblock, wherein said flexible link joins said bail to a first end of said lever and the remote end of said lever is connected to said pawl and ratchet means for intermittently moving said conveyor.

7. Cookie forming apparatus comprising:

a hopper for receiving cookie dough, said hopper being provided with a die at the bottom thereof having a plurality of apertures through which cookie dough passes for taking on an exterior shape corresponding to the exterior shape of said apertures, and including a pair of adjacently opposed dough rolls positioned in said hopper above said die and rotated in opposite directions for forcing dough toward said apertures and extruding dough through said apertures, a cutoff wire and a bail supporting said cutoff wire beneath said die for severing dough extruded through said die by said rolls, said cookie forming apparatus being provided with a cabinet and a common headblock positioned above said cabinet for mounting said hopper, said die, said dough rolls, and said bail supporting said cutoff wire, a conveyor located underneath said die for receiving extruded dough therefrom and severed by said cutoff wire, said conveyor being located on said cabinet, riser rod means extending through the top of said cabinet in supporting relation to said common headblock, and a vertically adjustable jack within said cabinet beneath said conveyor and attached in supporting relation to said riser rod means, a first drive motor mounted on said jack and having a first drive belt extending through the top of said cabinet to said headblock for driving said bail, and a second drive motor mounted on said jack and having a second drive belt extending through the top of said cabinet to said headblock for driving said dough rolls.

* * * * *